(12) United States Patent
Kim et al.

(10) Patent No.: US 12,341,704 B2
(45) Date of Patent: Jun. 24, 2025

(54) AUTONOMOUS QUALITY OF SERVICE PROVISIONING APPARATUS AND METHOD

(71) Applicant: ELECTRONICS AND TELECOMMUNICATIONS RESEARCH INSTITUTE, Daejeon (KR)

(72) Inventors: Do Young Kim, Daejeon (KR); Sun Me Kim, Daejeon (KR); Taesik Cheung, Daejeon (KR); Tae Kyu Kang, Daejeon (KR); Jeong-dong Ryoo, Daejeon (KR); Yeoncheol Ryoo, Daejeon (KR); Chang-ho Choi, Daejeon (KR)

(73) Assignee: Electronis and Telecommunications Research Institute, Daejeon (KR)

( * ) Notice: Subject to any disclaimer, the term of this patent is extended or adjusted under 35 U.S.C. 154(b) by 102 days.

(21) Appl. No.: 18/176,879

(22) Filed: Mar. 1, 2023

(65) Prior Publication Data
US 2023/0283563 A1   Sep. 7, 2023

(30) Foreign Application Priority Data

Mar. 3, 2022   (KR) .................. 10-2022-0027239

(51) Int. Cl.
| | | |
|---|---|---|
| H04W 28/02 | (2009.01) | |
| G06F 8/60 | (2018.01) | |
| G06F 9/50 | (2006.01) | |
| H04L 43/106 | (2022.01) | |
| H04L 45/302 | (2022.01) | |
| H04L 47/2483 | (2022.01) | |

(Continued)

(52) U.S. Cl.
CPC ........ *H04L 47/2483* (2013.01); *H04L 43/106* (2013.01); *H04L 45/302* (2013.01); *H04L 47/28* (2013.01); *H04L 69/22* (2013.01)

(58) Field of Classification Search
CPC ..... H04W 28/02; H04W 56/00; H04W 28/24; H04W 24/10; H04W 28/10; H04W 24/08; H04W 48/06; G06F 9/50; G06F 8/60
See application file for complete search history.

(56) References Cited

U.S. PATENT DOCUMENTS 7,609,700 B1 * 10/2009 Ying .................. H04L 65/80
709/227
10,938,739 B1 * 3/2021 Jain .................. H04L 47/786
(Continued)

FOREIGN PATENT DOCUMENTS

| KR | 1020180125272 A | 11/2018 |
|---|---|---|
| KR | 1020210043729 A | 4/2021 |

(Continued)

*Primary Examiner* — Nicholas R Taylor
*Assistant Examiner* — Ho T Shiu
(74) *Attorney, Agent, or Firm* — Rabin & Berdo, P.C.

(57) ABSTRACT

An autonomous quality of service provisioning apparatus and method are disclosed. The apparatus includes a parameter extraction unit receiving a packet transmitted from a transmitting terminal and extracting QoS parameters by analyzing the received packet; and a quality of service reservation unit configured to be associated with a controller that manages and controls resources of the network to request the controller to reserve resources corresponding to the extracted QoS parameters.

16 Claims, 7 Drawing Sheets

(51) Int. Cl.
*H04L 47/28* (2022.01)
*H04L 69/22* (2022.01)
*H04W 24/08* (2009.01)
*H04W 28/10* (2009.01)
*H04W 56/00* (2009.01)

(56) References Cited

U.S. PATENT DOCUMENTS

| | | |
|---|---|---|
| 2007/0038750 A1 | 2/2007 | Jorgensen |
| 2008/0130660 A1* | 6/2008 | Ros-Giralt .............. H04W 8/04 370/400 |
| 2019/0342784 A1* | 11/2019 | Na .................... H04W 28/0263 |
| 2020/0267785 A1 | 8/2020 | Talebi Fard |
| 2020/0404697 A1 | 12/2020 | Yang et al. |
| 2021/0329580 A1 | 10/2021 | Kim et al. |
| 2022/0078662 A1* | 3/2022 | Wang .................... H04M 15/66 |
| 2022/0109622 A1* | 4/2022 | Yeh ........................ H04L 69/40 |
| 2022/0377684 A1* | 11/2022 | Elazzouni ......... H04W 56/0015 |
| 2023/0104424 A1* | 4/2023 | Diachina .............. H04J 3/0667 370/350 |

FOREIGN PATENT DOCUMENTS

| | | |
|---|---|---|
| KR | 1020210088379 A | 7/2021 |
| KR | 1020210118918 A | 10/2021 |
| WO | 2020148616 A1 | 7/2020 |

\* cited by examiner

AUTONOMOUS QUALITY OF SERVICE PROVISIONING APPARATUS AND METHOD

CROSS REFERENCE TO RELATED APPLICATION

The present application claims priority to Korean Patent Application No. 10-2022-0027239, filed on Mar. 3, 2022, the entire contents of which is incorporated herein for all purposes by this reference.

BACKGROUND OF THE INVENTION

Field of the Invention

The present disclosure relates to autonomous quality of service (QoS; hereinafter referred to as "QoS") provisioning apparatus and method and, more specifically to autonomous QoS provisioning apparatus and method capable of autonomously provisioning required QoS by analyzing and determining data of a terminal device or application service in a telecommunication network.

Description of the Related Art

As a typical technology for provisioning QoS guarantee in a network such as the Internet, there are examples, such as Time-Sensitive Networking (hereinafter referred to as "TSN") technology in IEEE, DetNet (Deterministic Networking) technology in IETF, IntServ (Integrated Service) technology, and DiffServ (Differentiated Service) technology.

Here, the TSN is a representative low-latency, high-precision networking technology that provides deterministic QoS in fields such as factory automation, remote control of unmanned vehicles, and remote surgery; the IntServ technology is that QoS is guaranteed by pre-allocating and reserving resources in router devices located on all routes provisioning end-to-end session service; and the DiffServ technology is that classes of corresponding traffic are defined for each service requirement, and differentiated QoS is guaranteed for each class.

SUMMARY OF THE INVENTION

Accordingly, the present disclosure has been made keeping in mind the above problems occurring in the prior art, and an objective of the present disclosure is to provide autonomous QoS provisioning apparatus and method, which is capable of autonomously provisioning required QoS by analyzing and determining data of a terminal device or application service in a network, even though the terminal device and application service are not aware of QoS provisioning methods such as TSN, DetNet, IntServ, and DiffServ in a network, before initiating the service.

The technical problems to be achieved in the present disclosure are not limited to the technical problems mentioned above, but other technical problems not mentioned will be clearly understood by those skilled in the art from the description below.

According to an embodiment of the present disclosure, an autonomous QoS provisioning apparatus and method are provided. The autonomous QoS provisioning apparatus in a time-sensitive network, the apparatus includes a parameter extraction unit receiving a packet transmitted from a transmitting terminal and extracting QoS parameters by analyzing the received packet; and a QoS reservation unit configured to be associated with a controller that manages and controls resources of the network to request the controller to reserve resources corresponding to the extracted QoS parameters.

In addition, the autonomous QoS provisioning apparatus may further include a time synchronization unit exchanging time synchronization information with the controller to maintain time synchronization of the parameter extraction unit in a slave clock synchronized with a master clock of the controller.

Herein, the parameter extraction unit may include an address information extraction unit extracting information corresponding to source and destination node information of the received packet; and a QoS determination unit extracting QoS setup information required by the received packet.

Herein, the parameter extraction unit may include a traffic interval measurement unit analyzing the received packet to measure a traffic interval; a maximum packet size measurement unit analyzing the received packet to measure a maximum packet size; and an interval-wise maximum packet number measurement unit analyzing the received packets to measure interval-wise maximum packet number.

Herein, the QoS determination unit may extract the QoS setup information from priority information of a class of service set in header information of the received packet.

Herein, the transmitting terminal and the receiving terminal receiving the packet may be not equipped with QoS control function.

Herein, the parameter extraction unit may extract at least one of address information, QoS setting information, traffic interval, maximum packet size, and maximum number of packets per interval by receiving and analyzing the packet copied from a switch.

Herein, the QoS reservation unit may determine that the packet transmission is completed and request release of the reserved resource for the controller, when there is no packet input for more than twice the traffic interval obtained by analyzing the packet.

Herein, the QoS reservation unit may request release of the reserved resource for the controller, when the completion of the packet transmission is detected.

Herein, the parameter extraction unit may request QoS acknowledgment for the controller, and extract QoS parameters by analyzing the received packet when acknowledgment information is received from the controller.

The autonomous QoS provisioning method according to an embodiment of the present disclosure includes receiving a packet transmitted from a transmitting terminal not equipped with a QoS control function and extracting QoS parameters by analyzing the received packet; and in association with a controller that manages and controls resources of the network, requesting the controller to reserve resources corresponding to the extracted QoS parameters.

The features described above with respect to the present disclosure are merely exemplary aspects of the detailed description of the present disclosure that follows, and do not limit the scope of the present disclosure.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION OF THE INVENTION

Figure 1:
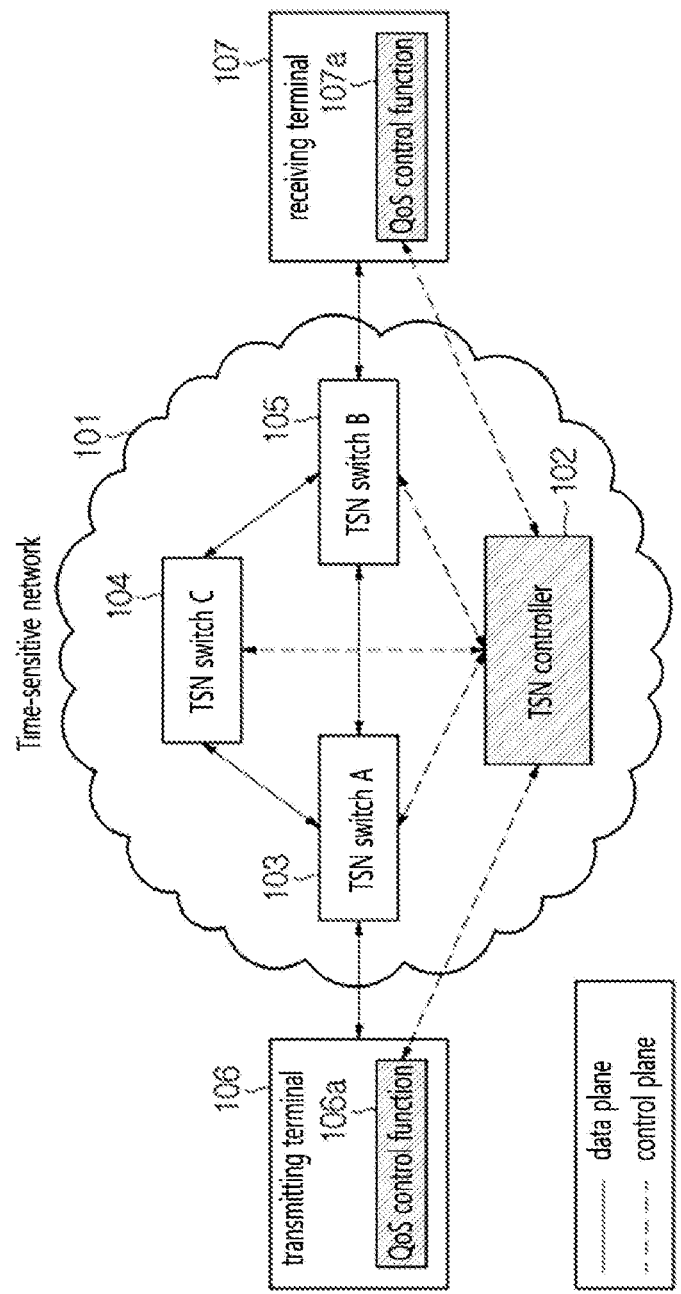
FIG. 1 is a diagram illustrating a configuration example of a time-sensitive network that is equipped with QoS control function for each terminal device to reserve QoS.

Hereinafter, with reference to the accompanying drawings, embodiments of the present disclosure will be described in detail so that those skilled in the art can easily carry out the present disclosure. However, the present disclosure may be implemented in many different forms, and is not limited to the embodiments described herein.

Upon describing the embodiments of the present disclosure, when it is determined that a detailed description of a known configuration or function may obscure the subject matter of the present disclosure, a detailed description thereof will be omitted. In the drawings, parts not related to the description of the present disclosure are omitted, and similar parts are referred to by similar reference numerals.

In the present disclosure, when a component is described as being "connected to", "coupled to" or "attached to" another component, it may be directly "connected to", "coupled to" or "attached to" the other component, or there may be one or more other components intervening therebetween. In addition, when the term "includes" or "has" specifies the presence of stated components, it does not preclude the presence of one or more other components unless otherwise stated.

In the present disclosure, terms such as first and second are used only for the purpose of distinguishing one element from another element, and do not define the order or importance of components unless otherwise specified. Accordingly, within the scope of the present disclosure, a first element in an embodiment may be referred to as a second element in another embodiment, and similarly, a second element in an embodiment may be referred to as a first element in another embodiment.

In the present disclosure, since components that are distinct from each other are only for clearly explaining feature thereof, it does not mean that the components are necessarily separated. That is, a plurality of components may be integrated to form a single hardware or software unit, or a single component may be distributed to form a plurality of hardware or software units. Therefore, even if not specifically mentioned, such integrated or distributed embodiments are also included in the scope of the present disclosure.

In the present disclosure, components described in various embodiments do not necessarily mean essential components, and some may be optional components. Thus, embodiments configured of a subset of components described in one embodiment are also included in the scope of the present disclosure. In addition, embodiments including other components in addition to the components described in various embodiments are also included in the scope of the present disclosure.

In the present disclosure, since expressions of positional relationships used in this specification, such as top, bottom, left, right, etc., are described for convenience of description, in the case of reverse viewing the drawings shown in this specification, the positional relationship described in the specification may be interpreted in the opposite way. Prior to describing the apparatus and method according to the present disclosure, a technology for providing QoS guarantees in a network such as the Internet is described as following.

A TSN that provides matching functions with time-sensitive networking, such as stream reservation control, TSN parameter creation, and related time synchronization is a networking technology that guarantees low latency and low jitter, lossless transmission, and data transmission bandwidth in a local area network (LAN) based on Ethernet bridging, medium access control (MAC), and physical layer technologies corresponding to the data link layer (Layer 2, L2) of the OSI 7-layer reference model, in which the TSN standards such as IEEE802.1Q are representative. The TSN is a representative low-latency, high-precision networking technology that provisions deterministic QoS in fields such as factory automation, remote control of unmanned vehicles, and remote surgery.

An IntServ technology is that QoS is guaranteed by pre-allocating and reserving resources in router devices located on all routes provisioning end-to-end session service, and is configured by specifying specifications that require end-to-end signaling and Reserve Specification (RSPEC)-based QoS by using a Resource Reservation Protocol (RSVP). The RSVP exchanges PATH and RESV messages between routers located on an end-to-end flow path to reserve resources necessary to provide QoS in the flow, and the RSPEC is specified as one of Best Effort, Controlled Load, and Guaranteed according to QoS requirements. Herein, a traffic specified as Guaranteed is required not to exceed the predetermined latency time.

A DiffServ technology is that of traffic is defined for each service requirement and differentiated QoS is guaranteed for each class. The DiffServ is proposed as an alternative of the IntServ, in order to overcome IntServ that has scalability issues due to signaling complexity, and allows each router to guarantee differentiated QoS for each packet class after defining up to 64 types of classes of QoS through the DS (Differentiated Services) field of the IP header. Depending on the required class of QoS, it is divided into Default, Class-selector, Assured Forwarding, and Expedited Forwarding, in which Expedited Forwarding provides the highest level of latency guarantees.

As representative examples of related international standard technologies, there are the IEEE TSN standards such as IEEE802.1Q, IEEE P60802 for applying the TSN to industrial automation, IEEE P802.1DG for applying the TSN to the inside of a car, 3GPP's 5G system extension standard for supporting IEEE's TSN in mobile environments such as 5G, and DetNet for which standardization is in progress with a wide-area TSN technology in the IETF.

Embodiments of the present disclosure is to autonomously provide required QoS by analyzing and determining data of a terminal device or application service in a network, even when the terminal device or the application service is not individually equipped with a QoS provisioning approach used in the network, such as, IEEE's TSN, IntServ, or DiffServ, etc., in order to provide ultra-low latency and lossless QoS required in wireless and wired communication networks.

Herein, the present disclosure allows provisioning QoS by determining QoS parameters in multi-path transmission, such as latency and the number of seamless trees that are required by a terminal device or application service in a network such as the internet, without a RSVP, QoS signaling, and the like used for subscribing to or reserving a separate QoS required by a terminal device or application service in a network such as the Internet.

That is, in order for the terminal device or the application service to ensure ultra-low latency and lossless transmission in the related art, the service has been initiated only when a means according to the QoS provisioning approach set in the network was separately prepared, and an appropriate fee was paid after subscribing to the corresponding QoS service. However, it has been difficult for individuals or small and medium-sized enterprises to secure so-called on-demand QoS as needed. The present disclosure may allow QoS to be autonomously provided for new terminal devices and application services in which new services such as network-based autonomous driving do not have appropriate means according to the QoS provisioning approach set in the network, or QoS changes frequently. Although a time-sensitive network may use various QoS guarantee mechanisms such as IEEE's TSN, IETF's DetNet, IntServ, and DiffServ, for convenience of explanation, the present disclosure will be described on the basis of an IEEE TSN technology, which is the most representative and widely used among time-sensitive network technologies. Of course, the present disclosure is not limited to IEEE TSN technology, and may be applied to all types of time-sensitive network technology described above.

FIG. 1 is a diagram illustrating a configuration example of a time-sensitive network that is equipped with QoS control function for each terminal device to reserve QoS, in which a path used for exchanging and setting QoS parameters is divided into control planes, and the path for exchanging user's data packets is divided into data planes after exchanging and setting QoS parameters.

As shown in FIG. 1, the time-sensitive network 101 may use a QoS guarantee mechanism such as IEEE's TSN, IETF's DetNet, IntServ, and DiffServ. The time-sensitive network 101 generally has a plurality of TSN switches 103, 104, 105 and a TSN controller 102, and is configured to use two or more redundant transmission paths to provide lossless service even in case of a connection failure or line breakage in a specific path. Generally, to request QoS guarantee of appropriate time-sensitive packets for the time-sensitive network 101, the transmitting terminal 106 and the receiving terminal 107 should be provided with QoS control functions 106a and 107a corresponding to QoS provisioning mechanisms (IEEE TSN, IETF DetNet, etc.) used by the corresponding network, respectively, in which they should be associated with each other according to the predetermined QoS provision standard. For the purpose of QoS guarantee, when the transmitting terminal 106 and the receiving terminal 107 initiate the service, the QoS control function 106a provided in the transmitting terminal 106 sends information including required QoS parameters to the TSN controller 102 of the time sensitive network 101. The TSN controller 102 analyzes the received QoS parameters based on the information and provides reservation acknowledgment (ACK) when resources in the time sensitive network 101 are available after the receiving terminal 107 is associated with the QoS control function 107a provided in the receiving terminal 107, thereby providing time-sensitive service based on the acknowledged QoS parameters between the transmitting terminal 106 and the receiving terminal 107.

Figure 2:
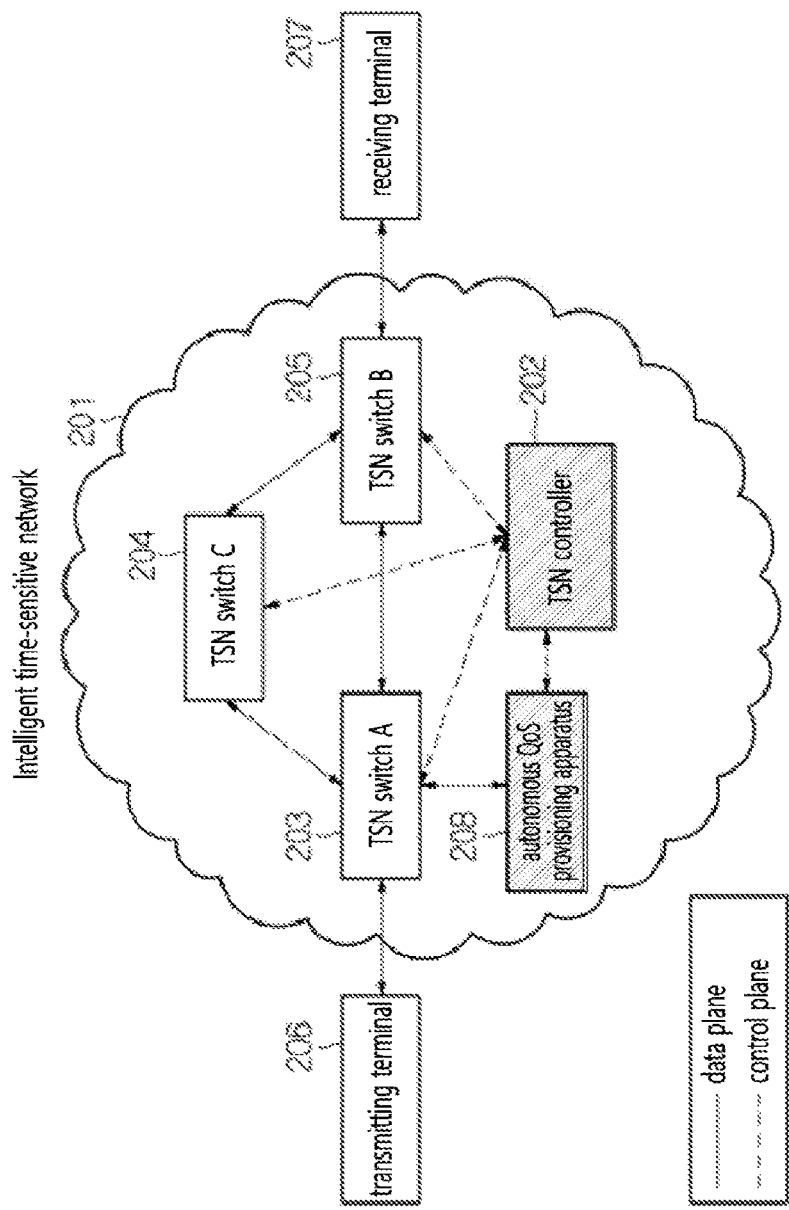
FIG. 2 is a diagram illustrating a configuration example of a time-sensitive network including an autonomous QoS provisioning apparatus according to an embodiment of the present disclosure.

FIG. 2 is a diagram illustrating a configuration example of an intelligent time-sensitive network including an autonomous QoS provisioning apparatus, according to an embodiment of the present disclosure, in which the intelligent time-sensitive network 201 including the autonomous QoS provisioning apparatus 208 is configured to provision appropriate QoS by analyzing and determining the attributes of data packets in the network even when the terminal device is not aware of a separate QoS control function.

As shown in FIG. 2, the autonomous QoS provisioning apparatus 208 according to an embodiment of the present disclosure is configured to provision QoS in association with a TSN controller 202. That is, the autonomous QoS provisioning apparatus 208 may autonomously determine the required QoS parameters for the transmitting terminal 206 and the receiving terminal 207 to provision dynamic QoS in association with the TSN controller 202 in the intelligent time-sensitive network 201, the intelligent time-sensitive network 201 having built-in the QoS control function 106a and 107a that should be equipped for each of the terminal device 106 and 107 shown in FIG. 1.

That is, the autonomous QoS provisioning apparatus 208 implemented in the intelligent time-sensitive network 201 according to the present disclosure may interpret and determine QoS parameters, such as maximum bandwidth, maximum latency, traffic interval, priority, and the number of seamless lossless links for guaranteeing the integrity level of packet transmission, which are required by using the data packet information transmitted by the transmitting terminal 206, to provide autonomous QoS provisioning service which allows sending/receiving QoS with the receiving terminal 207, without the need for the transmitting terminal 206 and the receiving terminal 207 to be aware of QoS parameters required by the corresponding terminal device or application service and to be associated with a QoS provisioning mechanism used by the network before initiating the communication service.

Here, the number of seamless lossless links may mean the number of links used herein, in which the same information is transmitted to multiple links (or paths) at the same time and then rearranged at the receiving end according to the importance of data in case of IEEE and IETF standards.

Figure 3:
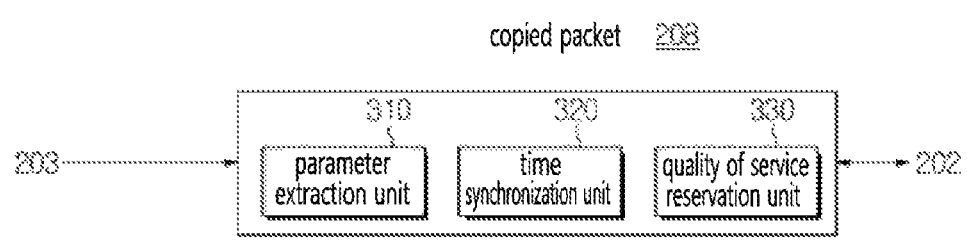
FIG. 3 is a diagram illustrating a conceptual configuration of the autonomous QoS provisioning apparatus according to an embodiment of the present disclosure.
Figure 4:
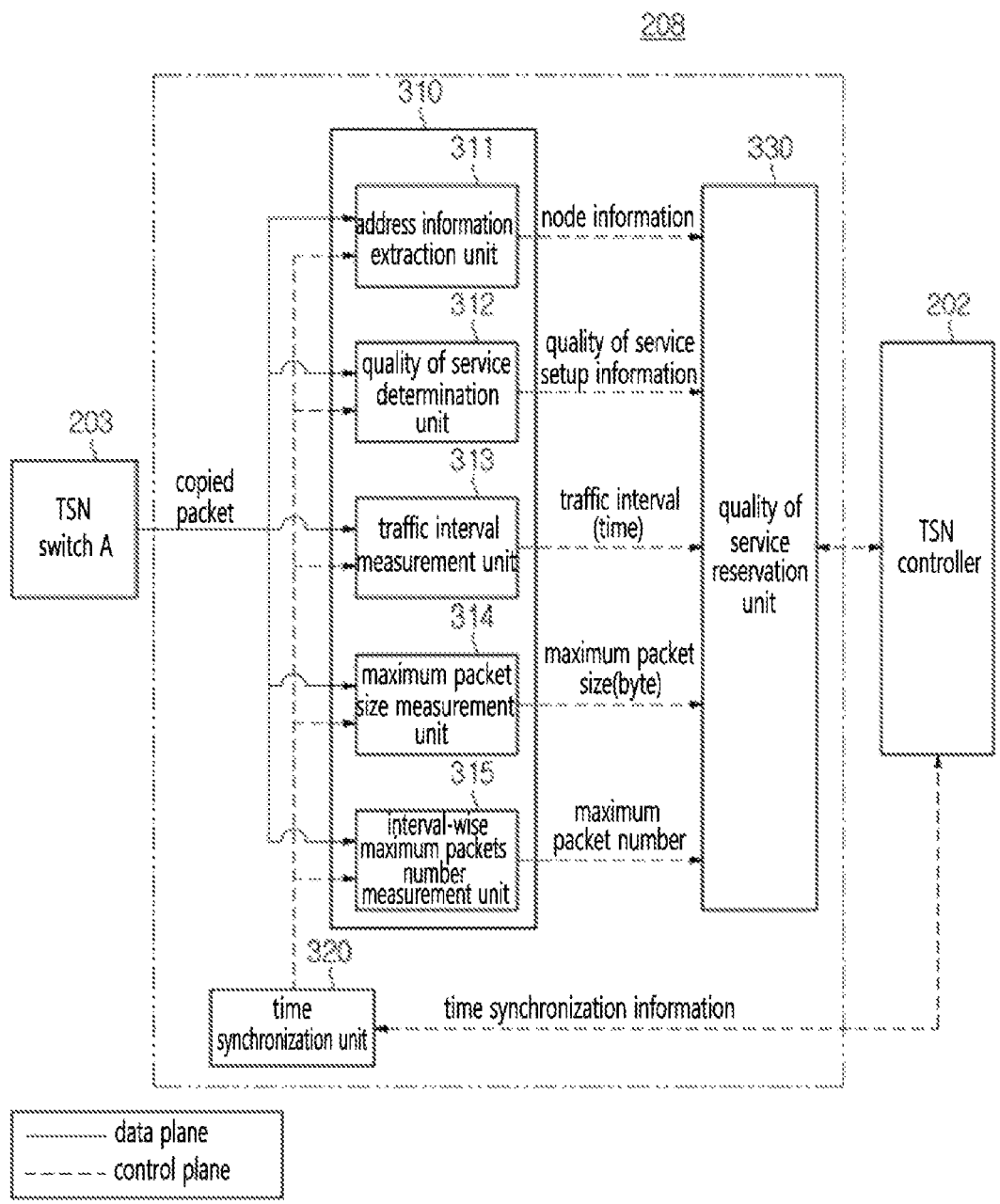
FIG. 4 is a diagram illustrating a detailed configuration of the autonomous QoS provisioning apparatus according to an embodiment of the present disclosure.

FIG. 3 is a diagram illustrating a conceptual configuration of an autonomous QoS provisioning apparatus according to an embodiment of the present disclosure; and FIG. 4 is a diagram illustrating a detailed configuration of an autonomous QoS provisioning apparatus according to an embodiment of the present disclosure.

Referring to FIGS. 3 and 4, the autonomous QoS provisioning apparatus 208 according to the present disclosure includes a parameter extraction unit 310, a time synchronization unit 320, and a QoS reservation unit 330.

The parameter extraction unit 310 extracts QoS parameters through real-time analysis of autonomous QoS packets, and delivers the extracted QoS parameters to the QoS reservation unit 330, when the autonomous QoS packet transmitted from the transmitting terminal 206 is copied and received by a TSN switch A 203, that is, when a copied packet is received.

Here, the TSN switch A 203 may be an edge node in the case of TSN as a network entity, and means an access node to which data packet information transmitted by the transmitting terminal 206 is transmitted. In order for transmission packets of the transmitting terminal 206 to be automatically forwarded and copied from the TSN switch A 203 to the autonomous QoS provisioning apparatus 208, the autonomous QoS provisioning apparatus 208 of the intelligent time-sensitive network 201 may be set as a proxy so that the corresponding packet may receive autonomous QoS service provided by the network. In other words, the TSN switch A 203 may copy the packet and provide the same to the autonomous QoS provisioning apparatus 208 only when the autonomous QoS provisioning apparatus 208 is set as a proxy for packets transmitted from the transmitting terminal 206. In contrast, when the autonomous QoS provisioning is unnecessary in a terminal device and application service, the autonomous QoS provisioning apparatus 208 is not set in the same way as a proxy, in which the packet information is not transmitted to the autonomous QoS provisioning apparatus 208.

The parameter extraction unit 310 includes an address information extraction unit 311, a QoS determination unit 312, a traffic interval measurement unit 313, a maximum packet size measurement unit 314, and an interval-wise maximum packets number measurement unit 315, and receives the copied packet from TSN switch A 203 and then sends the same to the address information extraction unit 311, the QoS determination unit 312, the traffic interval measurement unit 313, the maximum packet size measurement unit 314, and the interval-wise maximum packet number measurement unit 315, for the purpose of autonomous QoS provisioning.

Here, the address information extraction unit 311, the QoS determination unit 312, the traffic interval measurement unit 313, the maximum packet size measurement unit 314 and the interval-wise maximum packet number measurement unit 315 in the parameter extraction unit 310 may extract information on QoS parameters for requesting resources from the autonomous QoS packet, such as address information, QoS setup information, traffic interval, maximum packet size, and interval-wise maximum packet number, by maintaining time synchronization of the master clock of the TSN controller 202 with slave clocks controlled by the time synchronization unit 320.

The address information extraction unit 311 extracts information corresponding to source and destination nodes of the copied packet and generates node information of a type requested by the QoS reservation unit 330.

The QoS determination unit 312 extracts QoS setup information defined by the network operator from priority information of a class of service set in the packet header information copied from the application service of the transmitting terminal 206, which is the most important function to determine a level of QoS required by the copied packets. For example, for the TSN standard, the QoS determination unit 312 uses 3-bit class of service (CoS) information among MAC packets constituting the Link Layer to determine the maximum latency and QoS configuration information such as the number of lossless trees is extracted.

Table 1 below shows an implementation example of extracting QoS setup information such as maximum latency and the number of lossless trees by using 3-bit class of service (CoS) information of MAC packets, and also shows comparison results between embodiments of IEEE802.1Q, IEEE802.1D/802.1p, and Wi-Fi alliance that perform QoS mapping using the class of service information.

TABLE 1

| | Qos attribute definition used in the implementation for the preferred embodiment in this disclosure | | | QOS mapping example used | | |
|---|---|---|---|---|---|---|
| | Maximum | Number of | | IEEE | | WiFi alliance |
| Service class | latency/ jitter | Lossless trees | Qos attribute | 802.1Q | 802.1D/ 802.1p | AC (Access Priority) |
| 7 | <0.1 | 3 | Ultra-low latency ultra-reliable | NC (Network control) | NC (Network control) | AC_VO (voice) |
| 6 | <0.1 | 2 | Ultra-low latency high-reliable | IS (Internetwork control) | VO (Voice) | |
| 5 | <1 | 3 | low latency ultra-reliable | VO (Voice) <10 ms latency and jitter | VI (Video) | AC_VI (Video) |
| 4 | <1 | 2 | low latency high-reliable | VI (Video) <100 ms latency and jitter | CL (Controlled Load) | |
| 3 | <10 | 2 | low latency high-reliable | CA (Critical Application) | EE (Execllent Effort) | AC_BE (Best Effort) |
| 2 | <10 | 1 | Ultra-low latency | BE (Best Effort) | BE (Best Effort) | |
| 1 | BE (Best Effort) | 1 | Best Effort | EE (Excellent Effort) | — | AC_BK (Background) |
| 0 | BK (Background) | 1 | Background | BK (Background) | BK (Background) | |

In other words, the above Table 1 illustrates priorities for QoS reservation by the QoS determination unit 312 using the QoS information of the packet header and criteria for determining QoS parameters accordingly. Here, the class of service may have 8 priorities assigned to data packets according to low latency and high reliability levels, and may be expanded to 32 priorities depending on the type of packet header used.

The maximum latency/jitter (here, jitter is the level at which latency changes, meaning latency variation) required for ultra-low latency and low-latency services may be adjustably classified into 8 different grades, and at the same time provide transmission quality of different levels of reliability by allocating the number of lossless trees for the high reliability level to suit the classification standard. That is, when the number of lossless trees is one, the communication path resources in the network are allocated one each; when the number of lossless trees is two, the same communication path resources are allocated two each; when the number of lossless trees is three, the same communication path resources are allocated up to three each, thereby provisioning QoS capable of the highest level (lossless) of ultra-reliable.

As mentioned above, the QoS determination unit 312 uses level information of QoS required by the copied packet to extract QoS setup information such as the maximum latency and the number of lossless trees corresponding to the corresponding QoS level to provide the corresponding QoS level and provide the extracted QoS setup information to the QoS reservation unit 330.

The traffic interval measurement unit 313 uses a timer synchronized with the master clock provided by the time synchronization unit 320 and a traffic input/output detection function to measure a traffic interval (time) in milliseconds, and provides the measured traffic interval to the QoS reservation unit 330.

The maximum packet size measurement unit 314 uses a timer synchronized with the master clock provided by the time synchronization unit 320, a traffic input/output detection function, and a packet counter to measure the maximum packet size (bytes) and provides the measured maximum packet size (bytes) to the QoS reservation unit 330.

The interval-wise maximum packet number measurement unit 315 uses a timer synchronized with the master clock provided by the time synchronization unit 320, a traffic input/output detection function, and a packet counter to measure the maximum packet number, and provide the maximum packet number to the QoS reservation unit 330.

The time synchronization unit 320 exchanges time synchronization information with the TSN controller 202 to maintain time synchronization of the parameter extraction unit 310 with a slave clock synchronized with the master clock of the TSN controller 202. In other words, the time synchronization unit 320 may extract or measure the desired information from each of the address information extraction unit 311, the QoS determination unit 312, the traffic interval measurement unit 313, the maximum packet size measurement unit 314, and the interval-wise maximum packet number measurement unit 315 in the parameter extraction unit 310, by maintaining time synchronization of the slave clock with the master clock of the TSN controller 202.

Here, in the case of TSN, the time synchronization unit 320 may use a time synchronization mechanism specified in IEEE1588 as a preferred implementation example. For example, the time synchronization unit 320 exchanges time synchronization information with the time synchronization function implemented in the TSN controller 202 using the IEEE 1588 standard, and maintains time synchronization of the address information extraction unit 311, the QoS determination unit 312, the traffic interval measurement unit 313, the maximum packet size measurement unit 314, and the interval-wise maximum packet number measurement unit 315 with slave clocks synchronized with the master clock used by the intelligent time-sensitive network 201.

The QoS reservation unit 330 is associated with a controller, for example, the TSN controller 202 that manages and controls network resources to request the TSN controller 202 to reserve a resource corresponding to the QoS parameter extracted by the parameter extraction unit 310.

Here, QoS parameters, including node information (e.g., MAC addresses of transmitting and receiving nodes, etc.), QoS setting information, traffic interval (time), maximum packet size information, and maximum packet number information, which are received from the address information extraction unit 311, the QoS determination unit 312, the traffic interval measurement unit 313, the maximum packet size measurement unit 314, and the interval-wise maximum packet number measurement unit 315, may be configured with QoS parameter database on the basis of which the QoS reservation unit 330 requests resource reservation for the TSN controller 202.

Table 2 below shows an example of parameter data configuration for QoS reservation. The QoS reservation unit 330 configures the QoS parameter database by using the QoS parameters output from the address information extraction unit 311, the QoS determination unit 312, the traffic interval measurement unit 313, the maximum packet size measurement unit 314, and the interval-wise maximum packet number measurement unit 315 by analyzing the copied packet, secures resources according to the TSN controller 202 that manages and controls network resources and the QoS setup procedure used in the network, and then provides the QoS required by the transmitting terminal 206 to the receiving terminal 207. The QoS reservation unit 330 may use the standardized IEEE Stream Reservation Protocol (SRP) to implement the corresponding function in case of TSN, and use Reservation Protocol (RSVP) to implement the corresponding function in case of IntServ.

TABLE 2

| division | attribute | TSN parameter |
|---|---|---|
| Transmitting terminal | Stream ID | MAC address + unique ID |
| | Stream class | Class value |
| | Terminal interface | Interface ID |
| | Data frame | Transmitting/receiving MAC address/PCP |
| | | VLAN ID |
| | | Transmitting/receiving IP address, Version (V4/V6) |
| | | Transmitting/receiving port number |
| | | DSCP |
| | | Protocol |
| | Traffic standard | Traffic interval |
| | | interval-wise maximum frame number |
| | | Maximum frame size |
| | | Transmission selection |
| | | Most fast/slow transmission offset |
| | | Jitter |
| | User -> network requirement | Number of seamless trees |
| | | Maximum latency |

TABLE 2-continued

| division | attribute | TSN parameter |
|---|---|---|
| | Interface capability | VLAN tag |
| | | List of stream type |
| | | List of sequence type |
| Receiving terminal | Stream ID | MAC address + unique ID |
| | Terminal interface | Interface ID |
| | User -> network requirement | Number of seamless trees |
| | | Maximum latency |
| | Interface capability | VLAN tag |
| | | List of stream type |
| | | List of sequence type |
| Status information | Stream ID | MAC address + unique ID |
| | Status information | Transmitting terminal status (ready, failure) |
| | | receiving terminal status (ready, failure) |
| | | Failure code (lack of bandwidth) |
| | Cumulative latency | Cumulative latency value |
| | Interface configuration | Receiving/transmitting MAC address/PCP |
| | | VLAN ID |
| | | Transmitting/receiving IP address, version (V4/V6) |
| | | DSCP |
| | | Protocol |
| | | Transmitting/receiving port number |
| | | Time-aware offset |
| | Failed interface | Interface ID |

As described, even when a terminal device or application service is individually not equipped with or aware of a QoS provisioning approach used in the network, such as IEEE's TSN, IntServ, DiffServ, and the like, the autonomous QoS provisioning apparatus according to an embodiment of the present disclosure autonomously may provision the required QoS by analyzing and determining data of the terminal device or application service in the network, whereby it is possible to obtain the following effects.

First, even when a terminal device or an application service user is not exactly aware of the QoS standards required for executing successful service, such as maximum bandwidth or maximum latency, the autonomous QoS provisioning apparatus according to an embodiment of the present disclosure may accurately determine and extract QoS parameters, which leads to reducing initial burdens and costs of a developer of the terminal device or application service. As representative initial burdens and costs of terminal device or application service developers, there are development and function verification of QoS signaling protocol, increased device size and power consumption due to CPU time (computing power) and memory overhead (requiring large memory size), and maintenance costs for the QoS standard signaling function.

Second, the autonomous QoS provisioning apparatus according to an embodiment of the present disclosure may expect improved QoS as compared to QoS in the related art, since QoS protocol and standard maintenance necessary for successful service execution as well as cost reduction is performed only for the QoS provisioning apparatus embedded in the network, not for all terminal devices or application services. This may provide very powerful quality improvement, and convenience of prompt installation and maintenance, in the time of the revision of the corresponding QoS protocol and standard and the change of the QoS provisioning mechanism (upgrade, etc.).

Third, the autonomous QoS provisioning apparatus according to an embodiment of the present disclosure may detect and determine QoS parameters by a means (QoS provisioning apparatus) embedded in the network by analyzing the user data packet information, and thus dynamically respond to the request of a terminal device or application service to provide variable QoS in real time, thereby provisioning dynamic QoS even for new services whose QoS is not specifically defined or determined, such as hologram communication and autonomous driving communication.

Figure 5:
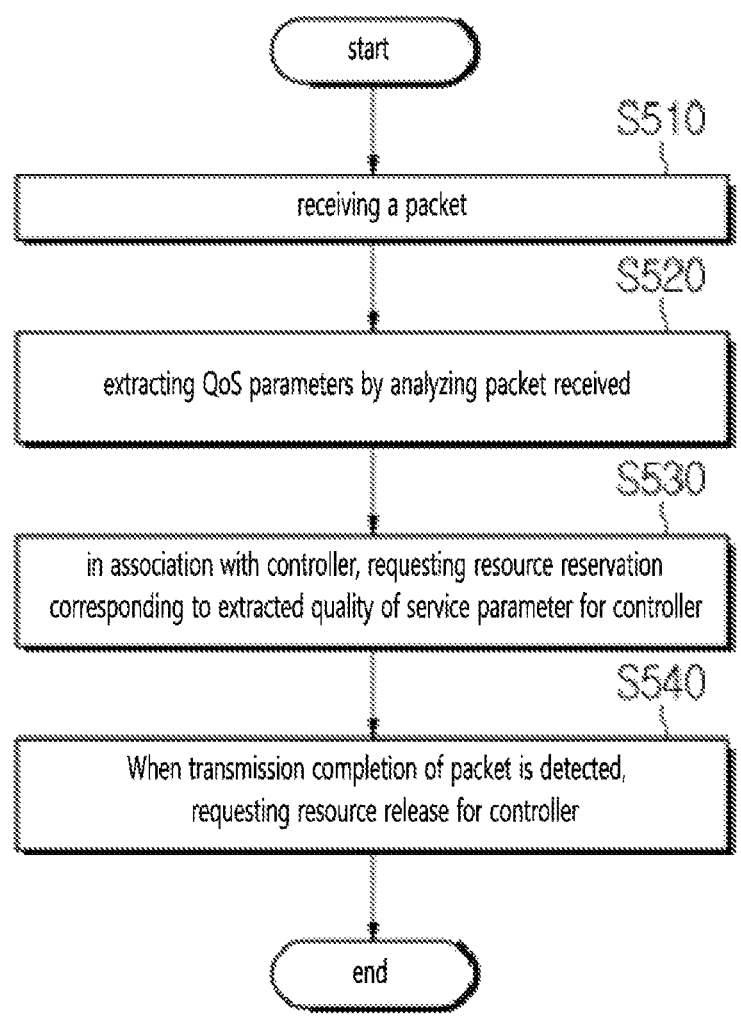
FIG. 5 is a flowchart illustrating an autonomous QoS provisioning method according to an embodiment of the present disclosure.

FIG. 5 is a flowchart illustrating an autonomous QoS provisioning method implemented by the autonomous QoS provisioning apparatus shown in FIGS. 2 to 4, according to an embodiment of the present disclosure.

Referring to FIG. 5, an autonomous QoS provisioning method according to an embodiment of the present disclosure includes receiving a packet transmitted from a transmitting terminal (S510), and analyzing the packet to extract QoS parameters for provisioning autonomous QoS service (S520).

Here, in step S510, a packet transmitted from a transmitting terminal may be copied and received by a switch, for example, the TSN switch A 203 of FIG. 2, and in step S520, the QoS parameters including address information, QoS setting information, traffic interval, maximum packet size, and interval-wise maximum packet number may be extracted by analyzing the MAC header fields of packet.

In step S520, the QoS parameters for requesting resources are extracted from the packet by maintaining time synchronization of the autonomous QoS provisioning apparatus with a master clock of the TSN controller.

When the QoS parameters for requesting resources are extracted in step S520, in association with a controller, for example, a TSN controller that manages and controls network resources, a resource reservation corresponding to the extracted QoS parameter is requested for the controller (S530).

When the resource reservation requested in step S530 is acknowledged (ACK) by the controller, a lossless transmission path is established between the transmitting terminal and the receiving terminal, and the packet transmitted from the transmitting terminal through the configured lossless transmission path is transmitted to the receiving terminal.

When transmission completion of the packet from the transmitting terminal is detected after the process of step S530, the autonomous QoS provisioning apparatus requests resource release for the controller, and when the controller acknowledges the requested resource release, the established lossless transmission paths are released to release autonomous QoS packet transmission (S540).

An autonomous QoS provisioning method according to an embodiment of the present disclosure will be described in detail with reference to FIG. 6.

Figure 6:
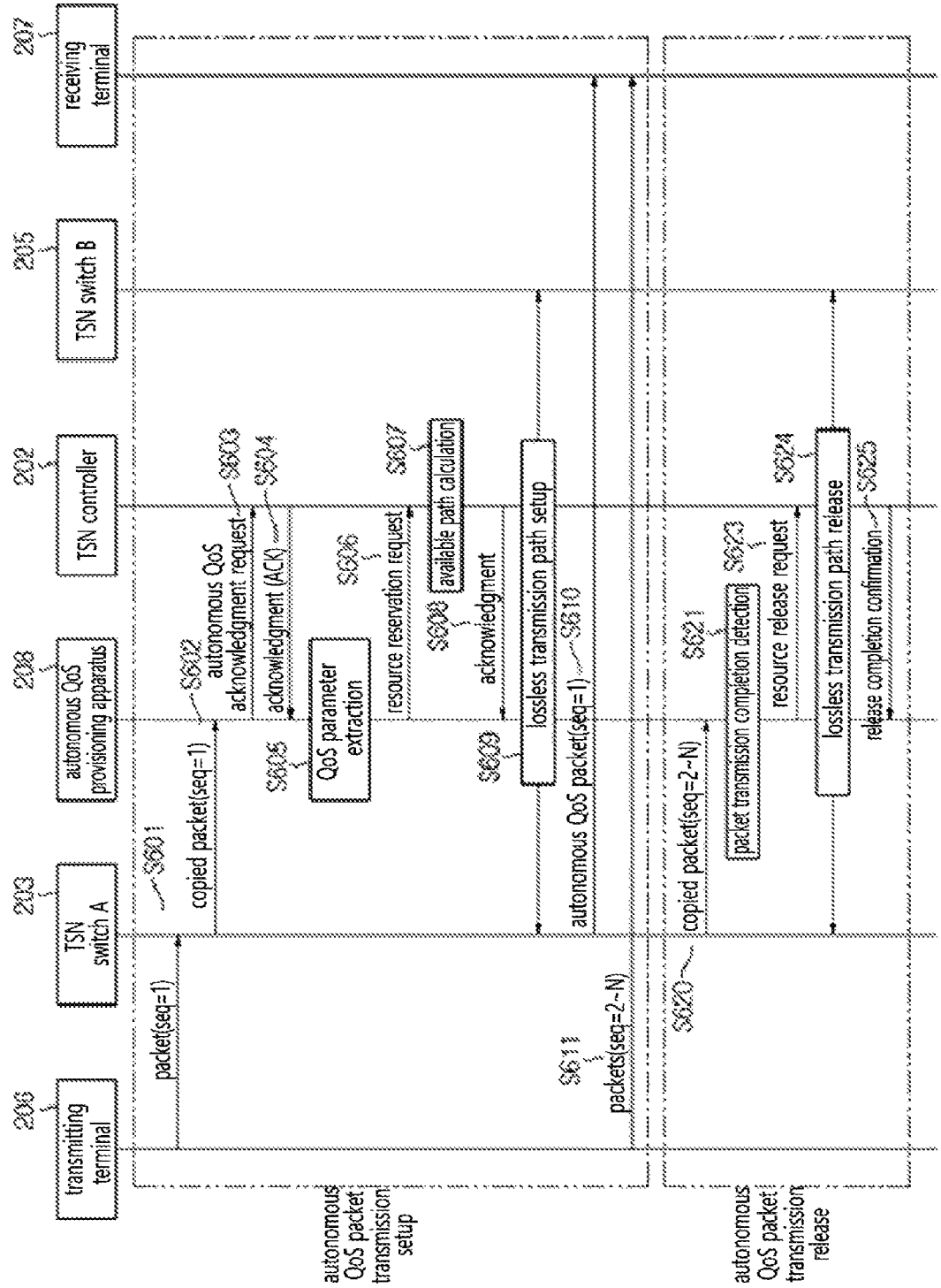
FIG. 6 is an exemplary diagram illustrating the autonomous QoS provisioning method according to an embodiment of the present disclosure.

FIG. 6 is an exemplary diagram for illustrating an autonomous QoS provisioning method according to an embodiment of the present disclosure, which shows association of the transmitting terminal 206, the receiving terminal 207, the TSN switch A 203, the TSN switch B 205, and the TSN controller 202, with respect to the autonomous QoS provisioning apparatus 208 shown in FIG. 2.

As shown in FIG. 6, the method according to an embodiment of the present disclosure includes establishing autonomous QoS packet transmission and releasing autonomous QoS packet transmission. Hereinafter, a serial number (seq=1 to N) of sequential packet information given for convenience of description will be described.

The autonomous QoS packet transmission setup is initiated as the transmitting terminal 206 transmits a packet (seq=1) to the TSN switch A 203 (S601); the copied packet transmitted from the TSN switch A 203 is transmitted to the autonomous QoS provisioning apparatus 208 only when the transmitting terminal 206 is set or registered to require autonomous QoS provisioning (S602); and when the autonomous QoS provisioning is determined to be necessary for the terminal device and application service, the packet information is transmitted by configuring the autonomous QoS provisioning apparatus 208 in the same way as a proxy. In contrast, when the autonomous QoS provisioning is determined to be unnecessary for the terminal device and application service, the autonomous QoS provisioning apparatus 208 is not configured in the same way as a proxy and thus the packet information is not delivered to the autonomous QoS provisioning apparatus 208. When the autonomous QoS provisioning apparatus 208 receives the copied packet (seq=1) information (S602), it performs autonomous QoS acknowledgment request (S603) for the TSN controller 202 with respect to current network resource status. When acknowledgment (ACK) information is received (S604), QoS parameter extraction and determination are performed (S605). When the TSN controller 202 receives the autonomous QoS acknowledgment request (S603) from the autonomous QoS provisioning apparatus 208, the TSN controller may signal acknowledgement (ACK) or negative-acknowledgment (NACK) according to the usage rate of network resources, which results in procedure for assigning priority to traffic of subscription-based or reservation-based users according to the existing method. The usage rate of network resources for the preferred implementation of the present disclosure may be initially 50%, and this usage rate may be operated in a form capable of being adjusted in a timely manner according to the size of the entire network implemented by the network operator and the service policy for autonomous QoS provisioning. For the preferred application of the present disclosure, the size of the entire network, for example, the size of TSN switches and links is preferably large enough to provide autonomous QoS provisioning service. That is, it is preferable that the ratio of the ACK response (S604) to the autonomous QoS authorization request (S603) is large enough to be greater than 99%.

The autonomous QoS provisioning apparatus 208 extracts QoS parameters from the header field of copied packets and determines them (S605), and requests resource reservation for the TSN controller 202 (S606). Herein, the autonomous QoS provisioning apparatus 208 may request resource reservation for the TSN controller 202 using IEEE's Stream Reservation Protocol (SRP). Regarding this request (S606), the TSN controller 202 calculates an available path among available resources (S607), and sends acknowledgment (S608) information to establish lossless transmission paths between TSN switch A 203 and TSN switch B 205 (S609) when the path is available. Herein, as in Table 1 above, when the number of lossless trees is 2 or more, two or more routes are established between the TSN switches, and typically, packets are discarded and rearranged according to the sequence number of packets in the redundant transmission and path of data packets between the multiple TSN switches. In the case of IEEE TSN, Frame Replication and Elimination for Reliability (FRER) technology may be used. The autonomous QoS packets (seq=1 to N) are transmitted to the receiving terminal 207 through the lossless transmission path (S610 and S611).

In autonomous QoS packet transmission release step, when the copied packet (seq=2 to N) is transmitted to the autonomous QoS provisioning apparatus 208 (S620) and then packet transmission completion is detected (S621), the autonomous QoS provisioning apparatus 208 requests resource release for the TSN controller 202 (S623) and, the lossless transmission path between TSN switches in the network is released (S624) by a release completion confirmation (S625) procedure of the TSN controller 202. In the autonomous QoS provisioning apparatus, the packet transmission completion detection (S621) is performed when data packets (seq=1 to N) do not arrive within the predetermined time. Herein, the predetermined time may be set to the time for which data packets are not input more than twice the traffic interval (in time) measured by the traffic interval measurement unit 313, or the time for which data packets are not arrived. The autonomous QoS provisioning apparatus 208 may request resource release for the TSN controller 202 when no autonomous QoS packet is input for a predetermined period of time or longer.

Figure 7:
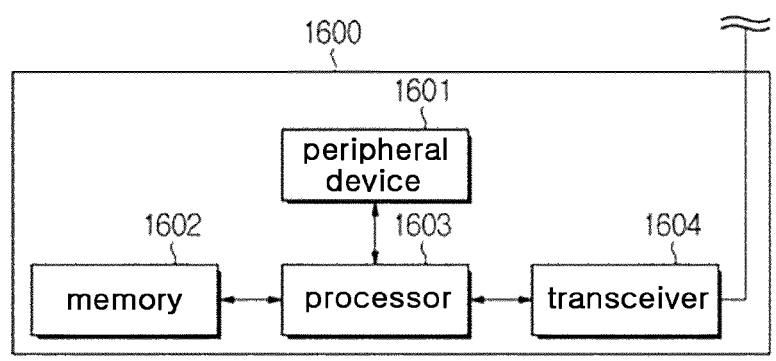
FIG. 7 is a diagram illustrating a configuration of a device to which an autonomous QoS provisioning apparatus according to an embodiment of the present disclosure is applied.

FIG. 7 is a diagram showing the configuration of a device to which the Qos provisioning apparatus according to an embodiment of the present disclosure is applied.

For example, the QoS provisioning apparatus according to the embodiment of the present disclosure of FIG. 4 may be the device 1600 of FIG. 7. Referring to FIG. 7, the device 1600 may include a memory 1602, a processor 1603, a transceiver 1604, and a peripheral device 1601. Further, as an embodiment, the device 1600 may further include other components, and is not limited to the above described embodiment. Here, the device 1600 may be, for example, a fixed network management device (e. g., server, PC, etc.).

More specifically, the device 1600 of FIG. 7 may be exemplary hardware/software architecture such as a QoS provisioning device, a QoS management device, a QoS control server or system, and the like. Herein, for example, the memory 1602 may be non-removable memory or removable memory. Further, as an example, the peripheral device 1601 may include a display, GPS, or other peripheral devices, and is not limited to the above-described embodiment.

In addition, as an example, the above-described device 1600 may include a communication circuit like the transceiver 1604, and perform communication with an external device based upon the same.

In addition, as an example, the processor 1603 may be a general purpose processor, digital signal processor (DSP), DSP core, controller, microcontroller, ASICs (application specific integrated circuits, FPGA (field programmable gate array) circuits, any other type of integrated circuit (IC), and one or more microprocessors associated with a state machine. That is, it may be a hardware/software configuration that performs a control role for controlling the device 1600 described above. In addition, the processor 1603 may modularize and perform the functions of the parameter extraction unit 310, the time synchronization unit 320, and the QoS reservation unit 330 described above in FIG. 3.

Herein, the processor 1603 may execute computer executable instructions stored in the memory 1602 to perform various essential functions of the autonomous QoS provisioning apparatus. For example, the processor 1603 may control at least one of signal coding, data processing, power control, input/output processing, and communication operations. In addition, the processor 1603 may control a physical layer, a MAC layer, and an application layer. In addition, as an example, the processor 1603 may perform authentication and security procedures in an access layer and/or an application layer, but is not limited to the above-described embodiment.

For example, the processor 1603 may communicate with other devices through the transceiver 1604. For example, the processor 1603 may control the autonomous QoS provisioning apparatus to communicate with other devices through a network through execution of computer executable instructions. That is, the communication performed in the present disclosure can be controlled. For example, the transceiver 1604 may transmit an RF signal through an antenna, and may transmit the signal based on various communication networks.

In addition, for example, MIMO technology, beamforming, etc. may be applied as an antenna technology, but is not limited to the above-described embodiment. In addition, a signal transmitted and received through the transceiver 1604 may be modulated and demodulated and controlled by the processor 1603, but is not limited to the above-described embodiment.

Although exemplary methods of this disclosure are presented as a series of actions for clarity of explanation, this is not intended to limit the order in which steps are performed, but each step may be performed simultaneously or in a different order if desired. In order to implement the method according to the present disclosure, methods may include other steps in addition to the illustrated steps, include other steps except for some steps, or include other steps in addition to some steps.

Various embodiments of the present disclosure are not intended to list all possible combinations, but are intended to illustrate representative aspects of the present disclosure, and matters described in various embodiments may be applied independently or may be applied in combination of two or more.

In addition, various embodiments of the present disclosure may be implemented by hardware, firmware, software, or a combination thereof. In the case of implementation by hardware, various embodiments may be implemented in one or more of application specific integrated circuits (ASICs), digital signal processors (DSPs), digital signal processing devices (DSPDs), programmable logic devices (PLDs), field Programmable Gate Arrays (FPGAs), general processors, and controllers, a microcontroller, microprocessor, etc.

The scope of this disclosure includes software that allows operations according to methods of various embodiments to be executed on a device or computer or machine-executable instructions (e.g., operating systems, applications, firmware, programs, etc.), and a non-transitory computer-readable medium in which such software or instructions are stored and executable on a device or computer.

DESCRIPTION OF DRAWING REFERENCES

208 autonomous QoS provisioning apparatus
310 parameter extraction unit
311 address information extraction unit
312 QoS determination unit
313 traffic interval measurement unit
314 maximum packet size measurement unit
315 interval-wise maximum packet number measurement unit
320 time synchronization unit
330 QoS reservation unit

The invention claimed is:

1. An autonomous quality of service provisioning apparatus in a time-sensitive network, the apparatus comprising:
 a parameter extraction unit configured to:
  receive a packet transmission from a transmitting terminal, and
  extract quality of service (QoS) parameters by analyzing intra-packet information, and inter-packet information, the intra packet information includes address information, a packet length and QOS setup information, and the inter-packet information includes an interval between packets, a maximum packet size, and an interval-wise maximum packet number,
 a quality of service reservation unit configured to be associated with a controller that manages and controls resources of the network to request the controller to reserve resources according to the extracted QOS parameters; and
 a time synchronization unit configured to perform time synchronization between a master clock of the controller and a slave clock to maintain time synchronization of the parameter extraction unit in the slave clock synchronized with the master clock of the controller,
 wherein the parameter extraction unit is further configured to:
 analyze the received packet based on the time synchronization; and
 analyze intra-packet information and inter-packet information based on the time synchronization to ensure accurate extraction of intra-packet and inter-packet information for autonomous QoS provisioning.

2. The apparatus of claim 1,
 wherein the time synchronization unit is further configured to:
 exchange information on the time synchronization with the controller to maintain time synchronization of the parameter extraction unit in the slave clock synchronized with the master clock of the controller.

3. The apparatus of claim 1, wherein the parameter extraction unit comprises:
 an address information extraction unit extracting information corresponding to source and destination node information of the received packet; and
 a quality of service determination unit extracting the QoS setup information required by the received packet.

4. The apparatus of claim 3, wherein the parameter extraction unit further comprises:
 a traffic interval measurement unit analyzing the received packet to measure a traffic interval;
 a maximum packet size measurement unit analyzing the received packet to measure the maximum packet size; and
 an interval-wise maximum packet number measurement unit analyzing the received packets to measure the interval-wise maximum packet number.

5. The apparatus of claim 3, wherein the quality of service determination unit is configured to extract the QoS setup information from priority information of a class of service set in header information of the received packet.

6. The apparatus of claim 1, wherein the transmitting terminal and a receiving terminal receiving the packet are not equipped with QoS control function.

7. The apparatus of claim 1, wherein the parameter extraction unit is further configured to extract at least one of the address information, the QoS setting information, a traffic interval, the maximum packet size, and the interval wise maximum packet number by receiving and analyzing a packet copied from a switch.

8. The apparatus of claim 1, wherein the quality of service reservation unit is further configured to determine that the packet transmission is completed and requests release of the reserved resources for the controller, when there is no packet input for more than twice a traffic interval obtained by analyzing the packet.

9. The apparatus of claim 1, wherein the quality of service reservation unit is configured to request release of the reserved resources for the controller, when completion of the packet transmission is detected.

10. The apparatus of claim 1, wherein the parameter extraction unit is configured to request QoS acknowledgment for the controller, and extract the QoS parameters by analyzing the received packet when acknowledgment information is received from the controller.

11. An autonomous quality of service provisioning method in a time-sensitive network, the method comprising:
- receiving a packet transmission from a transmitting terminal,
- extracting quality of service (QoS) parameters by analyzing intra-packet information, and inter-packet information, wherein the intra-packet information includes address information, a packet length, and QOS setup information, and the inter-packet information includes an interval between packets, a maximum packet size, and an interval-wise maximum packet number,
- in association with a controller that manages and controls resources of the network, requesting the controller to reserve resources according to the extracted QoS parameters,
- performing time synchronization between a master clock of the controller and a slave clock to maintain time synchronization of a parameter extraction unit in the slave clock synchronized with the master clock the controller, wherein the parameter extraction unit is configured to analyze the received packet based on the time synchronization,
- analyzing the received packet based on the time synchronization, and
- analyzing the intra-packet information and the inter-packet information based on the time synchronization to ensure accurate extraction of the intra-packet and the inter-packet information for autonomous QoS provisioning.

12. The method of claim 11, wherein extracting the QoS parameters comprises:
- exchanging information on the time synchronization with the controller; and
- extracting the QoS parameters by maintaining time synchronization in the slave clock synchronized with the master clock of the controller.

13. The method of claim 11, wherein extracting the Qos parameters comprises:
- extracting information corresponding to source and destination node information of the received packet and the QoS setup information required by the received packet.

14. The method of claim 13, wherein extracting the QoS parameters comprises:
- extracting the QoS setup information from priority information of a class of service set in header information of the received packet.

15. The method of claim 11, wherein extracting the QoS parameters comprises:
- extracting at least one information of the address information, the QoS setting information, a traffic interval, the maximum packet size, and the interval-wise maximum packet number, by receiving and analyzing the packet.

16. The method of claim 11, further comprising:
- determining that the packet transmission is completed and requesting release of the reserved resources for the controller, when there is no packet input for more than twice a traffic interval obtained by analyzing the packet.

* * * * *